March 12, 1963 M. C. HENDRICKSON 3,081,378

SECRECY COMMUNICATION RECEIVER

Filed May 3, 1960 3 Sheets-Sheet 1

INVENTOR
Melvin C. Hendrickson
BY James E. Tracy
ATTORNEY

SECRECY COMMUNICATION RECEIVER

Filed May 3, 1960 3 Sheets-Sheet 2

INVENTOR.
Melvin C. Hendrickson
BY
James E. Tracy
ATTORNEY

March 12, 1963 M. C. HENDRICKSON 3,081,378

SECRECY COMMUNICATION RECEIVER

Filed May 3, 1960 3 Sheets-Sheet 3

INVENTOR.
Melvin C. Hendrickson
BY James E. Tracy
ATTORNEY 3,081,378

SECRECY COMMUNICATION RECEIVER

Melvin C. Hendrickson, Elmhurst, Ill., assignor to Zenith Radio Corporation, a corporation of Delaware Filed May 3, 1960, Ser. No. 26,550
13 Claims. (Cl. 178—5.1)

Figure 1:
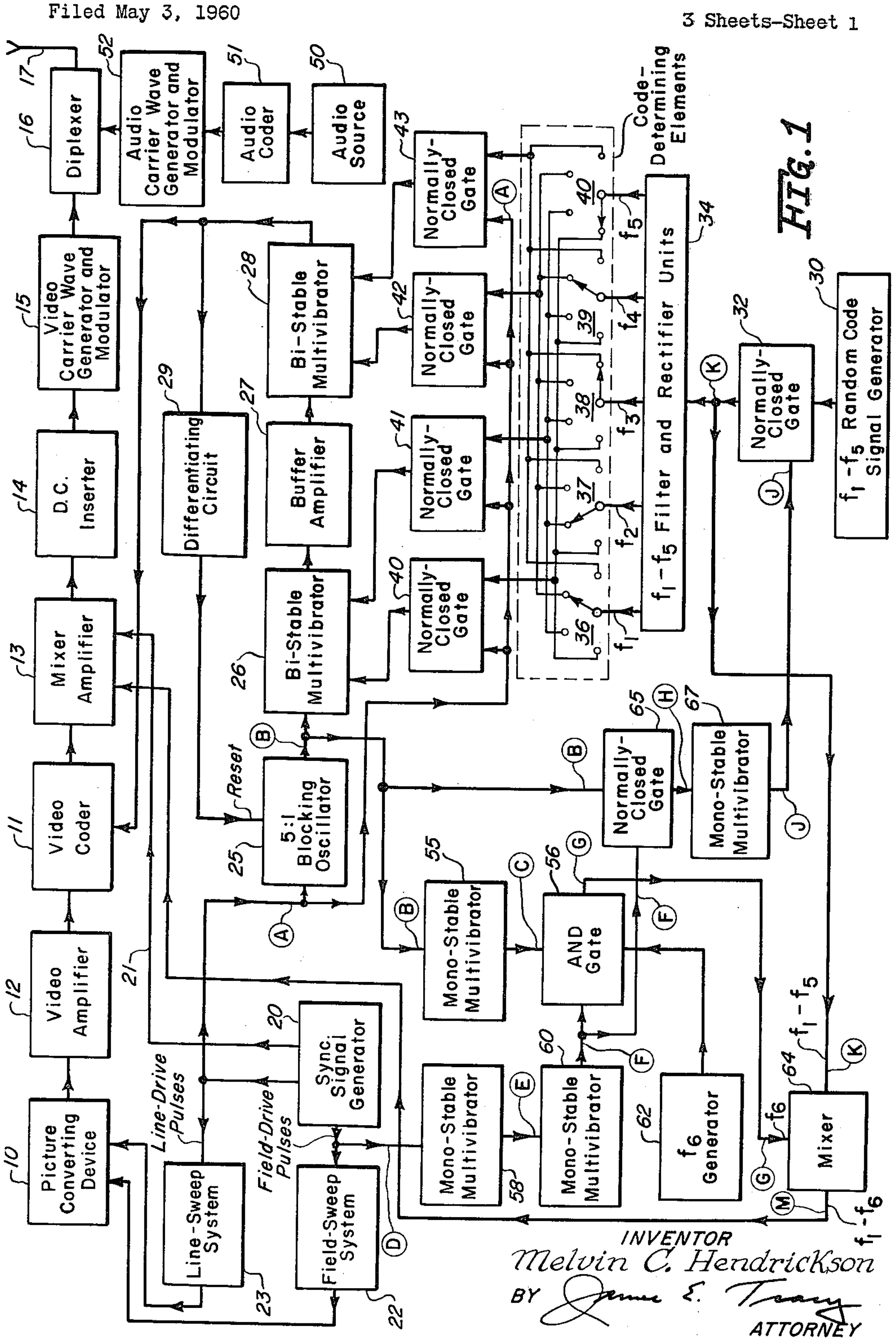

This invention relates to a secrecy communication receiver of the type including adjustable decoding apparatus which must be adjusted in a particular prescribed manner before decoding or unscrambling may be accomplished. More particularly, the invention pertains to a secrecy communication receiver wherein a correlation test is made between the instantaneous adjustment of the decoding apparatus and a given code pattern which represents the condition to which it should be adjusted to achieve decoding. In other words, the invention provides for an examination of the decoding apparatus to determine if that apparatus is actually adjusted properly so that decoding may take place. The arrangement of the present invention is particularly attractive when incorporated in a subscription television system and will be described in such an environment.

In a subscription television service it is expedient to provide each of the subscribers with decoding apparatus having a number of multi-position code-determining or signal-translating elements that are to be adjusted relative to one another in accordance with a pattern, preferably before the commencement of each program. The particular pattern of adjustment of the elements for any program is made known to subscribers wishing to subscribe thereto, and a charge assessment is levied on the basis of such information conveyed. Systems of this general type are disclosed and claimed in, for example, Patents 2,843,656, issued July 15, 1958; 2,823,252, issued February 11, 1958; 2,816,156, issued December 10, 1957; 2,910,526, issued October 27, 1959; 2,923,764, issued February 2, 1960; and 2,852,598, issued September 16, 1958, all of which are assigned to the present assignee.

It will be appreciated that there may be a temptation for unauthorized persons, not apprised of the adjustment pattern for a particular program, to employ a trial and error method of manipulating the code-determining elements in an attempt to reach the correct setting. Of course, if this effort should be successful, the individual would succeed in avoiding the obligation to make a payment for enjoying the subscription program. Trial and error adjustment of the decoder is a difficult task but it is suspected that the burden may possibly be eased through the observation of changes occasioned in the reproduced image as the trial and error process is pursued step-by-step. However, this type of cheating may be made even more difficult by arranging that no image shall appear on the screen unless and until the decoding apparatus has been conditioned as required to effect complete picture decoding. It is also advantageous to insure that the decoding of the audio portion of the telecast shall not occur until the decoding apparatus is properly adjusted. Rendering the audio channel completely inoperative until the receiver has been adjusted correctly permits the use of a relatively simple sound scrambling technique.

In copending applications Serial Nos. 823,463, filed June 29, 1959, now Patent No. 3,011,016, issued Nov. 28, 1961 in the name of Erwin M. Roschke, and 823,401, also filed June 29, 1959, and issued October 25, 1960, as Patent 2,957,939, in the name of George V. Morris, both of which applications are assigned to the present assignee, various arrangements are disclosed and claimed for achieving such objectives. In accordance with the disclosures of these copending applications, the correlation status between a given code schedule or pattern and the instantaneous adjustment of the adjustable code-determining elements is tested to determine if the subscriber has properly positioned his code-determining elements; if he has, decoding of the telecast is permitted but not otherwise. If desired a use or recording mechanism is concurrently actuated to record the fact that the subscriber has received and decoded the subscription program.

In the subscription system specifically disclosed in the Roschke application, during each field-retrace interval a combination of randomly occurring code signal components are permuted through a permuting mechanism or translator, comprising a plurality of code-determining elements, to a series of input circuits of a mode-determining circuit in the form of a bi-stable multivibrator. Because of the random occurrence of the code signal components, the bi-stable multivibrator is actuated between its two stable conditions at random to produce a rectangular shaped decoding or control signal having maximum and minimum amplitude levels for controlling the operation of the video decoder. Each time the decoding signal undergoes an amplitude excursion, a mode change is made in the system. The mode established at the termination of each combination of code components ensues for the entire succeeding field-trace interval. Because the bi-stable multivibrator has only two operating conditions, this system may be thought of as having two operating states.

A correlation signal component, whose occurrence is governed by the code schedule or mode-changing pattern of the telecast, is compared with the rectangular shaped decoding signal. If the wave forms of the signals compared exhibit a particular relationship, a control effect is derived which is indicative of the fact of their correlation and of the fact that the adjustable code-determining elements have been properly adjusted.

While the Roschke approach is attractive in that it successfully determines the correlation status between the adjustment of the code-determining elements and a predetermined adjustment to which they should be positioned to decode a particular program, it is possible that during short transient intervals the correlation test will indicate a correct setting of the code-determining elements when in fact their adjustment is not proper. This may arise since the correlation signal component is compared with a rectangular signal which has only two amplitude levels in the described system. If the code-determining elements are not correctly set, there is still a fifty-fifty chance that the mode-determining bi-stable multivibrator, during the occurrence of the correlation component, will be in that one of its operating condition that provides an output amplitude level resulting in an indication of correlation. The present invention constitutes an improvement over the Roschke system in that the chance of erroneous indications of correct correlation status is minimized considerably.

Accordingly, it is an object of the present invention to provide an improved system for achieving a correlation test.

It is another object of the invention to provide an improved secrecy communication receiver for developing a control effect indicating the degree or status of correlation between the instantaneous adjustment of the receiver with respect to a predetermined adjustment.

It is a further object of the present invention to provide an improved secrecy communication receiver.

A secrecy communication receiver, constructed in accordance with one aspect of the invention, utilizes an intelligence signal coded in accordance with a given code schedule. Decoding apparatus is provided which includes a plurality of adjustable code-determining elements to be adjusted relative to one another in accordance with a pattern dictated by the given code schedule in order to achieve decoding of the intelligence signal. This decoding apparatus is selectively operable in one of at least three different operating states as determined, at least partially, by the instantaneous adjustment of the code-determining elements. There are means for effectively comparing the instantaneous adjustment of the code-determining elements with the given code schedule to determine if the decoding apparatus is established during a particular interval, determined by the given code schedule, in a predetermined operating state. The receiver includes means for deriving from the comparing means a control effect indicating the correlation status between the given code schedule and the instantaneous adjustment of the code-determining elements, and also means for utilizing the control effect.

In accordance with another aspect of the invention, the decoding apparatus includes a multi-condition mechanism which, in response to an applied signal, is actuable from one to another of at least three operating conditions in accordance with a schedule partially determined by the instantaneous adjustment of the code-determining elements and partially determined by the applied signal. There are means for deriving an encoding signal having a characteristic effectively representing the given code schedule, and means for applying a portion of this encoding signal to the decoding apparatus for partially controlling the actuation of the multi-condition mechanism through some of its various operating conditions. Means are provided which are responsive to a portion of the encoding signal for effectively examining the instantaneous operating condition of the multi-condition mechanism during a particular interval, determined by the given code schedule, to determine if the multi-condition mechanism is actually established at that time in a predetermined operating condition. A control effect is derived from the examining means which indicates the correlation status between the given code schedule and the instantaneous adjustment of the code-determining elements.

According to a further aspect of the invention, signal-generating apparatus is provided which includes a plurality of adjustable code-determining elements to be adjusted in accordance with a predetermined adjustment. The generating apparatus is selectively operable in one of at least three different operating states as determined in part by the instantaneous adjustment of the code-determining elements. There are means for comparing the instantaneous adjustment of the code-determining elements with the predetermined adjustment to determine if the signal-generating apparatus is established in a predetermined operating state.

Figure 2:
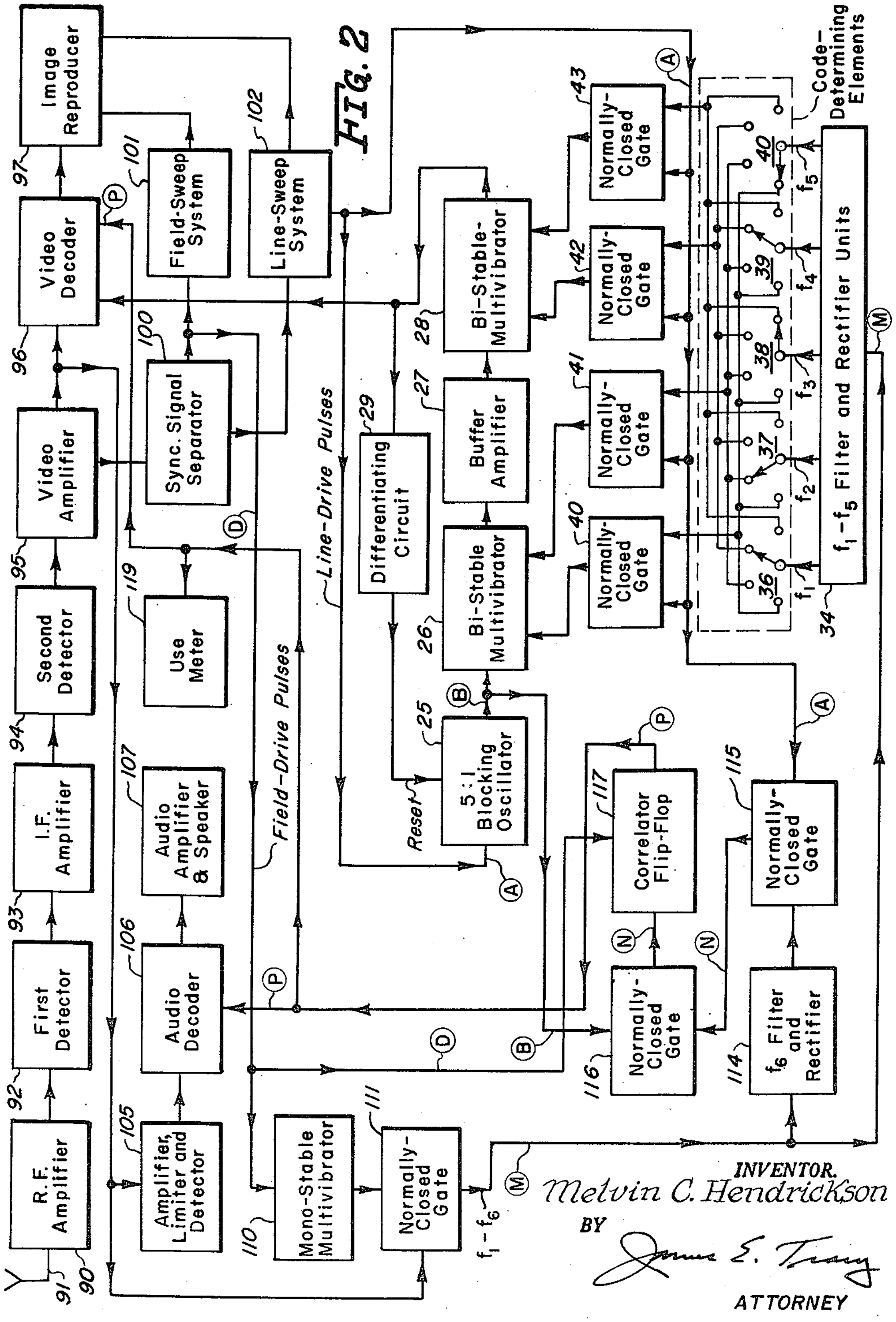
Figure 3:
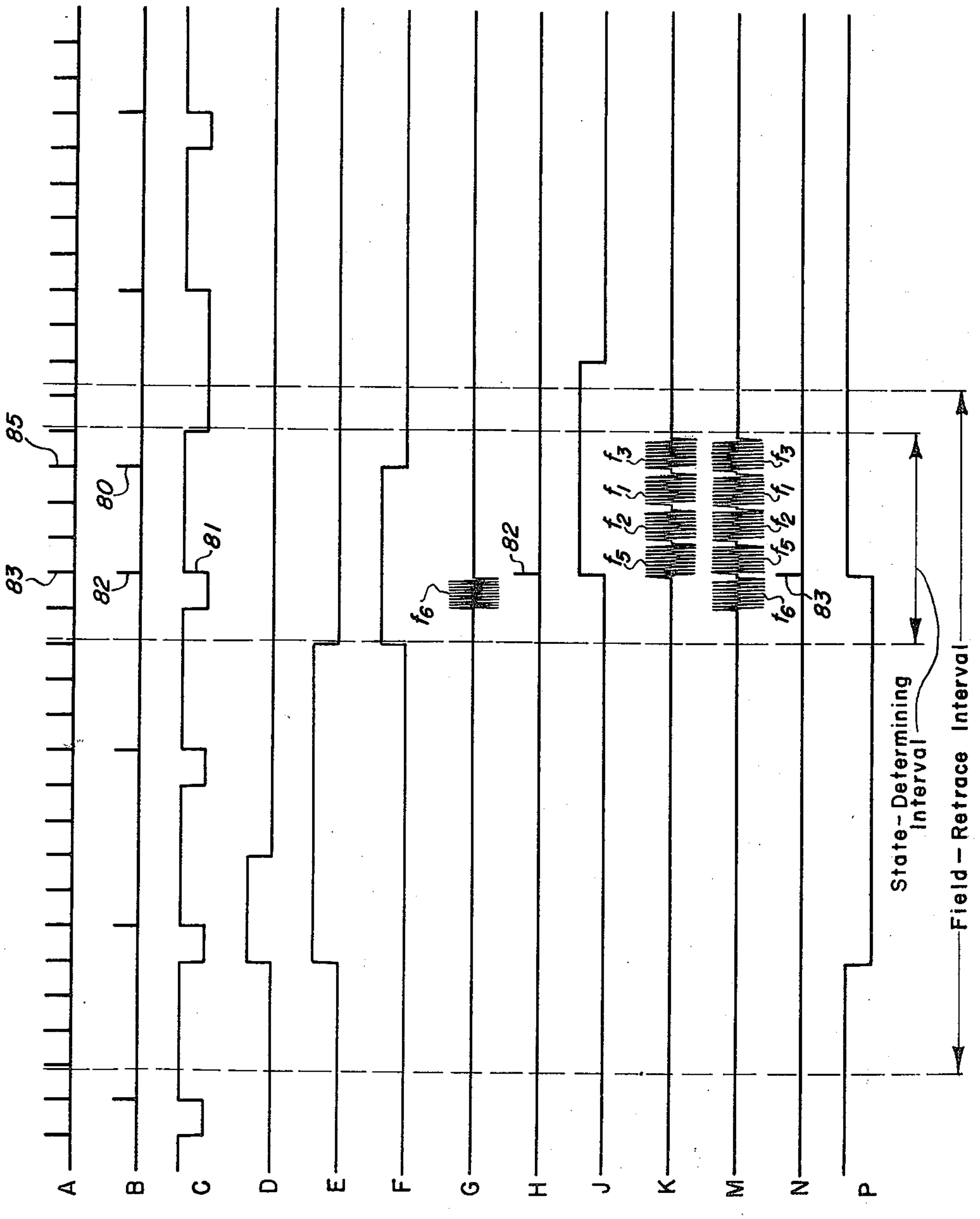

The features of this invention which are believed to be new are set forth with particularity in the appended claims. The invention, together with further objects and advantages thereof, may best be understood, however, by reference to the following description in conjunction with the accompanying drawings, in which identical reference numerals indicate identical elements, and in which:

FIGURE 1 is a block diagram representation of a secrecy communication transmitter, specifically a subscription television transmitter;

FIGURE 2 schematically illustrates a secrecy communication receiver, specifically a television receiver, constructed in accordance with one embodiment of the invention and arranged to utilize the signal transmitted from the transmitter of FIGURE 1; and, FIGURE 3 depicts a family of wave forms useful in explaining the operation of the transmitter of FIGURE 1 and the receiver of FIGURE 2.

Before turning to a description of the structure of FIGURE 1, it should be understood that many of the circuits shown in block diagram are illustrated in greater detail in several copending patent applications and issued patents, for example in applications Serial Nos. 479,170, filed December 31, 1954, in the name of Erwin M. Roschke; and 798,774, filed March 11, 1959, now Patent No. 2,995,624, issued August 8, 1961 in the name of Norman T. Watters, both of which are assigned to the present assignee. The expedient of block diagram illustration has been employed in the interest of simplification and in order to pinpoint clearly the invention.

Considering now more particularly the transmitter of FIGURE 1, a picture converting device or camera tube 10 is provided and may take any conventional form for developing a video signal representing an image to be televised. A video encoding device or coder 11 is coupled to the output terminals of camera tube 10 through a video amplifier 12. This coder may be similar to that disclosed and claimed in Patent 2,758,153, issued August 7, 1956 to Robert Adler, and assigned to the same assignee as that to which the present application is assigned. More particularly, coder 11 may comprise a beam-deflection switch tube having a pair of target anodes connected respectively to a pair of output circuits which may be selectively interposed in the video channel as the electron beam of the tube is deflected from one to the other of the two anodes, thereby to establish two different operating modes. A delay line is included in one of the output circuits so that when the beam is directed to the associated target, a time delay is introduced to the video components relative to the synchronizing components of the radiated television signal. Switching of the beam is accomplished in accordance with a secret code schedule or mode-changing pattern by means of a beam deflection-control or actuating signal applied to the deflection electrodes of coder 11. Of course, intermittently varying the relative timing of the video and synchronizing signals effectively codes the television signal since ordinary television receivers, not containing suitable decoding apparatus, require a television signal wherein there is a constant time relation between its video and synchronizing components. If such is not the case, intelligible image reproduction is impossible.

The output of coder 11 is coupled to one pair of input terminals of a mixer amplifier 13, which in turn is connected through a direct-current inserter 14 to a video carrier wave generator and modulator 15 having its output terminals connected through a diplexer 16 to a transmitting antenna 17. A synchronizing signal generator 20 supplies the usual field- and line-synchronizing components and associated pedestal components to mixer amplifier 13 over suitable circuit connections, here schematically illustrated as a single conductor 21. Generator 20 further supplies field- and line-drive pulses to a field-sweep system 22 and to a line-sweep system 23, respectively. The output terminals of sweep systems 22 and 23 are connected to the field- and line-deflection elements (not shown) associated with picture converting device 10.

Synchronizing-signal generator 20 additionally supplies line-drive pulses to one input of a multi-condition mechanism in the form of a conventional 5:1 step-down blocking oscillator 25 which has its output terminals connected to the input circuit of a cascade arrangement of two bistable multivibrators 26 and 28 separated by a buffer amplifier 27. Specifically, the output of blocking oscillator 25 is connected to the "common" or "counting" input circuit of bi-stable multivibrator 26. This multivibrator may be of conventional construction, including the usual pair of cross-coupled triodes or transistors rendered conductive in alternation as the multivibrator is triggered between its two stable operating conditions. Blocking oscillator 25 is coupled to both of the triodes or transistors, whichever the case may be, by way of the common or counting input so that the multivibrator is always triggered from its instantaneous condition, whatever one that may be, to its opposite condition in response to successive pulses applied from the oscillator. Amplifier 27 is connected to multivibrator 28 in a fashion similar to the connection of oscillator 25 to multivibrator 26 so that multivibrator 28 is always actuated from one to the other of its two stable operating conditions in response to successive pulses from amplifier 27. The output terminals of multivibrator 28 connect to the deflection electrodes of coder 11. Since the cascade arrangement of blocking oscillator 25 and multivibrators 26 and 28 realize a total count-down ratio of 20:1, the control signal from multivibrator 28 exhibits a rectangular wave shape having amplitude changes every ten line traces. This effects actuation of video coder 11 between its two operating conditions and interposes the time-delay network in the video channel during alternate groups of ten successive line-trace intervals to introduce a time delay between the radiated video and the synchronizing components.

Blocking oscillator 25 is a counting mechanism which, in response to applied periodically recurring signal components, is actuated step-by-step through a sequence of five operating steps in completing each cycle of operation. On the other hand, the arrangement of units 25, 26 and 28, considered collectively, constitutes a counting apparatus having a sequence of twenty operating steps.

To reset blocking oscillator 25 to its reference or zero-count step, a feedback circuit, including a differentiating circuit 29, is provided from the output of multivibrator 28 to the reset input of the oscillator. The amplitude excursions of the control signal from multivibrator 28 determine when oscillator 25 is reset.

In order to interrupt the periodic, cyclic actuation of counting chain 25, 26, 28, a random code signal generator 30 is provided for developing during a portion of each field-retrace interval, called a "state-determining interval," a combination of code signal components individually having a predetermined identifying characteristic, such as frequency, and collectively representing coding information in accordance with their appearance and order within the combination. Suitable generating apparatus for performing the function assigned to block 30 in the present application is shown, for example, in the aforementioned Druz et al. Patent 2,923,764; Patent 2,862,049, issued November 25, 1958 in the name of Jack E. Bridges, assigned to the present assignee; and also in copending application Serial No. 463,702, filed October 21, 1954, now Patent No. 2,947,804, issued Aug. 2, 1960, in the name of Carl G. Eilers et al., and also assigned to the present assignee. As explained in detail in these prior disclosures, the code signal-combination during each field-retrace interval may comprise a series of up to six code bursts, each of which may be any of six various frequencies designated $f_1$–$f_6$, inclusive, preferably randomly sequenced, randomly appearing within the overall code burst interval. The maximum of six code signal bursts occur during intervals between successive line-synchronizing pulses superimposed on the vertical blanking pedestal subsequent to the second series of equalizing pulses. The six successive line-trace intervals, making up the state-determining interval, may for convenience be designated "slots," as has been done in copending application Serial No. 829,106, filed July 23, 1959, in the name of Richard C. Herrmann et al., and assigned to the present assignee. For reasons which will be appreciated later, it is expedient that the code burst frequencies exhibit only the five different frequencies $f_1$–$f_5$. Of course, the code generating apparatus of the prior disclosures may be modified in very simple fashion in order that five rather than six signal frequencies are developed.

The output of random code signal generator 30 is connected to one input of a normally-closed gate circuit 32, the output of which is connected to a series of five filter and rectifier units, conveniently shown in FIGURE 1 by a single block 34, respectively selective to assigned ones of the different frequencies $f_1$–$f_5$ to facilitate separation of the code signal components from one another. The five outputs of the filter and rectifier units, each of which produces rectified pulses or envelopes of one of frequencies $f_1$–$f_5$ as indicated in the drawing, are individually connected to an assigned one of a series of five adjustable code-determining elements 36–40. Specifically, each of the code-determining elements takes the form of a simple four-position rotary switch. Corresponding stationary contacts of switches 36–40 are connected together in common and thence to an input circuit of a respective, assigned one of a series of four normally-closed gate circuits 40–43. More particularly, starting with the stationary contact on the extreme left for each of switches 36–40 and considering the contacts in clockwise order, the four stationary contacts of each switch are connected respectively to gates 40–43. The $f_1$ output of filter and rectifier units 34 is connected to the movable contact of code-determining element 36, the $f_2$ output to the rotary contact of switch 37, the $f_3$ output is connected to the movable contact of switch 38, the $f_4$ output of units 34 is coupled to the movable contact of switch 39, and the $f_5$ output of filter and rectifier units 34 is connected to the movable contact of four-position rotary switch 40.

Code-determining or signal-translating elements 36–40 collectively may be considered a permutation or a transposition mechanism for establishing different prescribed ones of a multiplicity of different interconnection patterns between the input circuits to the code-determining elements and the output circuits therefrom. Of course, the form taken by code-determining elements 36–40 in the present disclosure is relatively simple but obviously much more sophisticated switching arrangements may be employed. For example, suitable permutation switching mechanisms for serving the function of code-determining elements 36–40 and at the same time providing adequate degrees of security against unauthorized deciphering are disclosed in Patents 2,866,961, issued December 30, 1958, in the name of George V. Morris; 2,903,686, issued September 8, 1955, and issued April 18, 1961 as Patent 2,980,901, in the name of Jack E. Bridges; and in copending patent application Serial No. 490,078, filed February 23, 1959, now Patent No. 2,980,901 in the name of George V. Morris et al., all of which patent disclosures are assigned to the present assignee.

It is not necessary that switches 36–40 be individually adjustable under the control of a corresponding number of control knobs. For example, a card or tape having different patterns of perforations may be employed to set up the switches. Connections between the input and output circuits would be established through the holes. Moving the tape or card would present a different pattern or lay out of holes to the switches, thereby establishing a different permutation between the input and output circuits of the code-determining elements.

Code-determining elements 36–40 are provided to permute applied code signal components of frequencies $f_1$–$f_5$ in order that they may be fully coded before they are used for coding the program signal. It is contemplated that this switching arrangement will be adjusted differently for each different program for which a charge is to be assessed and, if desirable, the arrangement of code-determining elements installed at each receiver within a given service area will require a different setting for any selected program in order that each subscriber must obtain different switch setting data for each program.

Normally-closed gate circuits 40–43 are also individually connected to synchronizing signal generator 20 to receive line-drive pulses therefrom. The output circuits of gates 40 and 41 are connected to input circuits of multivibrator 26, and the output circuits of gates 42 and 43 are connected to input circuits of bi-stable multivibrator 28. Gates 40 and 42 are preferably coupled to the common or counting input circuits of multivibrators 26 and 28, respectively, so that each time a pulse is translated through one of those gates, the associated multivibrator is triggered from its instantaneous condition, whichever one that may be, to its opposite condition in the same manner as if it had been supplied with a pulse from blocking oscillator 25, in the case of multivibrator 26, or from buffer amplifier 27 in the case of multivibrator 28. On the other hand, the connections from gates 41 and 43 are preferably connected to "reset" inputs of multivibrators 26 and 28, respectively, which actuate the multivibrators to predetermined ones (specifically, to zero count) of their two operating conditions. If either of the multivibrators is already in that condition when a pulse is supplied thereto from its associated one of gates 41, 43, there will be no actuation and the pulse will be ineffective.

The audio signal portion of the telecast is provided by audio source 50 which may constitute a conventional microphone and audio amplifier. The output of audio source 50 is coupled through an audio coder 51 to one input of an audio carrier wave generator and modulator 52, the output circuit of which is coupled to another input of diplexer 16. Audio coder 51 may take any one of a multiplicity of different forms. The only requirement is that it successfully scramble the audio intelligence. Coder 51 may, for example, be simply a frequency shift type of coder in which heterodyning techniques are employed to shift the audio information, with an inverted frequency distribution, to a portion of the frequency spectrum where it does not normally reside. Preferably, the audio signal is shifted or moved to a higher portion of the frequency spectrum. Such an audio scrambling function is adequate since it effectively codes a characteristic of the audio signal inasmuch as a normal television receiver would not contain suitable compensating circuitry for re-inverting the audio signal components.

As will be explained, circuitry identical to units 25–43 is found in the receiver of FIGURE 2 and in order to maintain precise synchronism of operation between such corresponding circuitry, it is essential that the code-determining element 36–40 at the receiver be positioned identically as the companion switches in the transmitter of FIGURE 1. To test for correlation in accordance with the present invention, namely to effectively compare the switch setting pattern of the receiver with respect to that at the transmitter, it is necessary that a correlation signal component be generated at the transmitter and conveyed to the receiver. This correlation signal component, as will be learned, is tied in or related to the code schedule of the coded video signal.

To this end, the output terminals of 5:1 blocking oscillator 25 are also coupled to the input of a single-trip or mono-stable multivibrator 55, whose output terminals are connected to one input of an AND gate 56. The parameters of mono-stable multivibrator 55 are so selected that once it is actuated from its normal to its abnormal operating condition, it will remain there for a time interval embracing four complete line-trace intervals. Another mono-stable or single-trip multivibrator 58 is coupled to synchronizing signal generator 20 to derive field-drive pulses therefrom and has its output terminals connected to a mono-stable multivibrator 60 which, in turn, has its output circuit connected to another input circuit of AND gate 56. Multivibrator 58 is designed so that it actuates to its abnormal condition in response to the leading edge of each field-drive pulse and remains in that condition for a period of nine complete line-trace intervals, at which time it returns to its normal operating condition. Mono-stable multivibrator 60, on the other hand, is constructed so that it assumes its abnormal condition in response to the trailing edge of each output pulse from multivibrator 58 and remains there for a period of five complete line-trace intervals. It will be appreciated later that the timing and duration of the output pulse from multivibrator 60 is actually determined by the particular portion (namely, the state-determining interval) of each field-retrace interval in which code signal bursts from random code signal generator 30 appear. A signal generator 62 which produces a continuous sinusoidal signal of frequency $f_6$ is coupled to another input of AND gate 56. The single output circuit of AND gate 56 is connected to one input of a mixer 64.

The output of blocking oscillator 25 is also coupled to one input of a normally-closed gate circuit 65, another input of which is connected to the output of mono-stable multivibrator 60. The output of gate 65 is connected to the input of a mono-stable or single-trip multivibrator 67, which is designed to assume, when triggered, its abnormal condition for six full line-trace intervals. The output of multivibrator 67 is connected to another input of normally-closed gate circuit 32.

Considering now the operation of the transmitter of FIGURE 1, picture converting device 10 develops a video signal representing the picture or image information to be televised and, after amplification in amplifier 12, the video signal is translated through video coder 11 to mixer amplifier 13 wherein it is combined with the customary field- and line-synchronizing and blanking pulses from synchronizing signal generator 20. Mixer 13 therefore develops a composite video signal which is applied through direct current inserter 14 to video carrier wave generator and modulator 15 wherein it is amplitude modulated on a picture carrier for application through diplexer 16 to antenna 17 from which it is radiated to subscriber receivers. Sweep systems 22 and 23 are synchronized by the field- and line-drive pulses from generator 20 in conventional manner.

Audio source 50 meanwhile picks up the sound information accompanying the telecast, amplifies and supplies it to audio coder 51 wherein the audio components are shifted in the spectrum to occupy abnormal positions to achieve sound scrambling. The coded audio signal is frequency modulated on a sound carrier in unit 52 and supplied through diplexer 16 to antenna 17 for concurrent radiation to subscriber receivers with the video information.

Coding of the video portion of the telecast is achieved by coder 11 under the influence of a deflection-control signal developed from line-drive pulses by blocking oscillator 25 and multivibrators 26 and 28 for periodically switching the beam of the beam-deflection tube in coder 11 back and forth between its two collector anodes in accordance with the code schedule represented by the amplitude variations of the control signal, which occur every ten line traces because of the total 20:1 ratio of counting stages 25, 26, 28. This actuation of encoding device 11 varies the operating mode of the transmitter after every group of ten successive line-trace intervals by modifying the time relation between the video and synchronizing components of the radiated signal and provides effective picture scrambling or coding.

In order to interrupt this periodic mode-changing pattern and increase the complexity of the code schedule, a combination of up to six code signal components or bursts individually exhibiting one of frequencies $f_1$–$f_5$ is developed in source 30 during the state-determining portion of each field-retrace interval. Assuming for the moment that gate 32 is established in its open or translating condition, the bursts of frequency $f_1$–$f_5$ are separated from one another and rectified in filter and rectifier units 34 for individual application to normally-closed gates 40–43 via code-determining elements 36–40. The distribution of the rectified envelopes or pulses of frequencies $f_1$–$f_5$ to gates 40–43 depends, of course, on the instantaneous setting of the code-determining elements. In this way, the code signal components are effectively permuted. FIGURE 1 illustrates a typical setting of elements 36–40. Gates 40–43 also receive line-drive pulses from generator 20 and gate in those of the line-drive pulses that occur in time coincidence with the rectified code bursts to the various input circuits of multivibrators 26 and 28. The multivibrators are therefore actuated in response to selected ones of the line-drive pulses. Since the code components are preferably randomly sequenced, the cyclic actuation of the multivibrators, normally taking place in response to pulses from oscillator 25 only, is interrupted or disrupted so that upon the termination of each combination of code bursts the counting chain, made up of units 25, 26 and 28, is established at a different one of its twenty operating steps from that in which it would have been established if the periodic actuation had not been interrupted.

The control signal developed in the output of multivibrator 28 constitutes a rectangular shaped signal which is phase modulated during field-retrace intervals. In order to add additional scrambling to the system, the rectangular shaped control signal from multivibrator 28 is differentiated in differentiating circuit 29 and the differentiated pulses are fed back to oscillator 25 for resetting purposes. Depending on the particular point in the circuit of oscillator 25 at which the reset pulses are applied, determines whether resetting is accomplished in response to the positive- or negative-going amplitude excursions of the control signal from multivibrator 28. If, for example, unit 25 is arranged so that resetting is only accomplished in response to positive pulses or spikes, then the pulses developed in differentiator circuit 29 are of correct polarity only in response to positive-going amplitude excursions of the control signal, the negative spikes developed in differentiator 29 from the negative going excursions having no effect.

Since the random actuation of multivibrators 26 and 28 controls the resetting of oscillator 25, the oscillator is also effectively reset at random so that upon the termination of each combination of code signal bursts occurring during a state-determining interval, the output pulses of blocking oscillator 25 may exhibit any one of five different phase conditions. Since the blocking oscillator is actuated only by line-drive pulses during the field-trace intervals, the phase condition of the output pulses from oscillator 25 at the termination of each code burst combination endures or persists for the entire succeeding field-trace interval. Each of the five phase conditions may be considered an operating state of the coding apparatus, and thus blocking oscillator 25 establishes the coding apparatus selectively in one of five different operating states. It may be assumed that blocking oscillator 25, multivibrators 26 and 28, video coder 11, differentiator 29, gates 40–43, code-determining elements 36–40, and filter and rectifier units 34, principally make up the coding apparatus. The operating state, or phase condition of the output pulses from oscillator 25, is changed as a result of the random nature of the code signal bursts from generator 30 and also the instantaneous adjustment of code-determining elements 36–40.

Considering now the specific manner in which the present invention is implemented, attention is directed to the idealized signal wave forms shown in FIGURE 3, identified by letter designations which are also shown in the circuit of FIGURE 1 indicating the various points at which the wave forms appear. The periodically recurring line-drive pulses which actuate blocking oscillator 25 are shown in curve A. Because of the 5:1 division of oscillator 25, pulses like those shown in curve B are developed in the oscillator output. It will be noted that the first four pulses (starting from the left) of curve B occur in periodically recurring manner and in response to every five successive line-drive pulses. The fifth pulse, however, designated 80, appears during the state-determining interval and after only three line-drive pulses. Subsequent to pulse 80, the last two pulses of curve B recur in regular fashion. It will be assumed that pulse 80 is produced due to the effect of a reset pulse applied over the reset input of oscillator 25, which is initiated by the feedback signal from multivibrator 28. The timing of pulse 80 determines which one of the five possible operating states the coding apparatus will assume during the entire field-trace interval subsequent to the field-retrace interval shown in FIGURE 3. Of course, oscillator 25 may be reset more than once during a state-determining interval as the result of random actuation of multivibrators 26 and 28. Assume, for example, that oscillator 25 is reset one full line trace subsequent to pulse 80, in which case the coding apparatus assumes a different one of the five operating states.

The pulses of curve B from the output of oscillator 25 are applied to mono-stable multivibrator 55 to produce the signal of wave form C. Multivibrator 55 is triggered to its abnormal condition in response to each pulse of curve B and remains there for four horizontal trace intervals before it returns to its reference condition. Pulse 80 has no effect on multivibrator 55 since the multivibrator is already established in its abnormal condition at that time. The purpose of multivibrator 55 is to develop a gating pulse of negative polarity one line trace in duration and occurring immediately preceding each output pulse of blocking oscillator 25, other than the output pulses like 80 resulting from the reset operation. In this way, a negative polarity gating pulse is provided immediately preceding the first "free count" output pulse of blocking oscillator 25 during the state-determining interval, namely during the interval in which the code signal bursts from generator 30 initiate disruption of the normal counting action of the coding apparatus. It will be appreciated that the output pulses of oscillator 25 are due to either a normal completion of a five-step counting cycle, in which case they are called "free count" pulses, or due to the feedback signal from unit 28, in which case they may be called "reset" pulses. Pulse 80 of curve B is a reset as distinguished from a free count output pulse. Pulse 82 of curve B, on the other hand, is a free count pulse.

The gating pulses of curve C are applied to one input of AND gate 56. Meanwhile, field-drive pulses, like the one shown in curve D, are applied to mono-stable multivibrator 58, which responds to the pulse of curve D to produce the positive-polarity pulse of curve E for application to mono-stable multivibrator 60 which in turn develops the positive-polarity pulse of curve F for application to another input of AND gate 56. Generator 62 continuously supplies a sinusoidal signal of frequency $f_6$ to a third input of AND gate 56. Unit 56 must, of course, be simultaneously supplied with three different input signals over its three input circuits before a signal is developed at its output. The positive pulse of curve F and negative pulse 81 of curve C therefore cooperate to effectively translate to the output of gate 56, and thence to an input of mixer 64, during the interval of pulse 81 a burst of code signal of frequency $f_6$, as shown by wave form G.

It will be noted that the burst of curve G endures for one complete line trace immediately preceding the first free count pulse, designated 82, of curve B during the state-determining interval. The timing of pulse 82, of course, is determined by the manner in which blocking oscillator 25 had been reset as a result of the code components during the field-retrace interval preceding the one shown in FIGURE 3, namely the timing of pulse 82 was determined one full field trace preceding the state-determining interval of FIGURE 3. Consequently, the timing of the burst of curve G effectively represents the operating condition in which oscillator 25 is established, or the counting step executed by oscillator 25, during the interval of pulse 82. The timing of the $f_6$ burst of curve G also is a representation of the operating state of the coding apparatus during the preceding field-trace interval. It should be realized that each code burst of frequencies $f_1$–$f_5$ is not effective until the occurrence of the immediately succeeding line-drive pulse in both the coding apparatus and the decoding apparatus. This obtains since the rectified envelope of each code burst embraces the immediately succeeding line-drive pulse and thus gates in that line-drive pulse to the multivibrators. With the $f_6$ burst of curve G so positioned, it may be employed at a receiver to gate in or select line-drive pulse 83 of curve A.

The gating pulse of curve F is also employed to open normally-closed gate 65 in order to gate in to the input of mono-stable multivbrator 67 pulse 82 (curve H) developed in the output of oscillator 25. Multivibrator 67 therefore actuates to its abnormal condition in response to pulse 82 and remains there for six complete line-trace intervals. The signal developed in the output of multivibrator 67 is shown in curve J and is applied to one input of normally-closed gate 32 to provide a gating signal therefor.

Returning now to random code signal generator 30, some of the code signal bursts of frequencies $f_1$–$f_5$ are effectively inhibited in normally-closed gate 32. This gate is only turned on or established in its translating condition in response to the positive pulse component of wave form J. Consequently, any code signal bursts produced by random code signal generator 30 before the occurrence of free count pulse 82 are effectively deleted or removed. This expedient is employed for two reasons. In the first place, it is desirable that no code signal burst of one of frequencies $f_1$–$f_5$ occurs simultaneously with the $f_6$ correlation burst of curve G. Moreover, it is necessary that multivibrator 28 is not actuated by a code component which in turn would cause resetting of blocking oscillator 25 until the oscillator has been permitted to produce a free count pulse during the state-determining interval. The combination of code bursts shown in wave form K is thus typical of what may be developed at the output of gate 32 during a given field-retrace interval. It will be assumed that pulse 80 of curve B results from the actuation of multivibrator 28 by the $f_1$ burst of curve K.

It should now be apparent why resetting of blocking oscillator 25 has purposely been delayed until subsequent to the first free count pulse of the oscillator. In order to effectively examine the instantaneous operating condition of the blocking oscillator in the receiver similar to oscillator 25 in the transmitter, it is essential that the $f_6$ correlation burst of curve G occur before the blocking oscillator is subjected to a reset pulse from differentiator 29. This insures that the operating state of the receiver during the entire field-trace interval preceding the field-retrace interval shown in FIGURE 3 may be determined.

The code signal bursts of frequencies $f_1$–$f_5$ shown in curve K are applied to one input of mixer 64 and the $f_6$ correlation burst of curve G is applied to another input of mixer 64 from the output of AND gate 56. Consequently, all of the frequencies $f_1$–$f_6$ may be found in the output of mixer 64 as shown by curve M. The combination of curve M is supplied to another input of mixer amplifier 13 for concurrent radiation to the subscriber receivers along with the video information.

Of course, it is not essential that the $f_6$ correlation burst be transmitted with the code bursts and the video information. For example, the correlation bursts may be conveyed to a receiver with the audio signal in which case the bursts may occur during field-trace intervals.

The receiver of FIGURE 2 is constructed in accordance with one embodiment of the invention in order to decode especially the coded television signal developed in the transmitter of FIGURE 1. A radio-frequency amplifier 90 has its input terminals connected to a receiving antenna 91 and its output circuit connected to a first detector or oscillator-mixer 92, which is connected in turn through an intermediate-frequency amplifier 93 to a second detector 94. This detector is coupled through a video amplifier 95 and a video decoder 96 to the input terminals of an image reproducing device 97. Decoding device 96 may be identical in construction to coding device 11 in the transmitter except that it is controlled to operate in complimentary fashion in order to effectively compensate for variations in the timing of the video and synchronizing components of the received television signal. Specifically, when a delay is introduced at the transmitter between the occurrence of a radiated line-drive pulse and the video information occurring during the immediately succeeding line-trace interval, that video signal is translated through decoding device 96 with no delay, whereas when no delay is introduced at the transmitter, a delay is imparted to the video signal in video decoder 96. Video amplifier 95 is also coupled to a synchronizing signal separator 100 which is connected to the usual field-sweep system 101 and line-sweep system 102 connected in turn to the deflection elements (not shown) associated with picture tube 97.

Assuming that the illustrated receiver is of the intercarrier type, an intercarrier signal component is derived from video amplifier 95 and is supplied to a unit 105 consisting of a conventional amplifier, amplitude limiter and discriminator detector. The output of unit 105 is coupled through a frequency shift audio decoder 106 to an audio amplifier and speaker, combined for illustrative purposes in a single unit 107. Audio decoder 106 may be similar to audio coder 51 in the transmitter except that it is effectively operated in complimentary fashion in order to shift or return the scrambled audio information from the portion of the spectrum which it occupies as transmitted back to its original location as required to accomplish audio unscrambling.

While basically video decoder 96 and audio decoder 106 are identical to their counterparts in the transmitter, they differ in one very important respect from such counterparts. Each of decoders 96, 106 is normally disabled or blocked by, for example, a bias arrangement and is rendered operative to unscramble or decode a scrambled signal only during intervals when an appropriate actuating or gating signal is applied thereto in a manner to be explained.

In order to facilitate the separation of the code signal and correlation components of curve M from the composite television signal, a mono-stable multivibrator 110 is connected to separator 100 to receive field-drive pulses therefrom and the output of multivibrator 110 is coupled to one input of a normally-closed gate 111, another input of which is coupled to the output of video amplifier 95 to receive the coded composite video signal. The output of gate 111 is connected to a series of filter rectifier units, for separating code bursts $f_1$–$f_5$ from each other, once again illustrated for convenience as a single block 34. By comparing the arrangement of elements 25–43 in FIGURE 2, it is manifest that this circuitry is identical in construction and arrangement with the correspondingly numbered units in the transmitter of FIGURE 1. The only difference is that while blocking oscillator 25 in the transmitter receives line-drive pulses from the sync synchronizing generator, oscillator 25 in the receiver of FIGURE 2 receives line-drive pulses from line-sweep system 102.

In order to achieve a test of correlation in accordance with one aspect of the present invention, a separate $f_6$ filter and rectifier unit 114 is connected to the output of gate 111. The output of unit 114 is connected to one input of a normally-closed gate 115, another input of which is connected to line-sweep system 102 to receive line-drive pulses therefrom. The output of gate 115 is connected to one input of a comparison device in the form of a normally-closed gate 116, another input of which is connected to the output of blocking oscillator 25 in the receiver of FIGURE 2. The output of gate 116 is connected to one input of a correlator flip-flop 117 which, of course, may also be called a bi-stable multivibrator. Another input of flip-flop 117 is connected to separator 100 to receive field-drive pulses therefrom. This flip-flop has two stable operating conditions. In response to input pulses from gate 116 it assumes a predetermined one of its operating conditions, and in response to applied pulses over its other input from separator 100 bi-stable multivibrator 117 is triggered to its other stable operating condition.

The output of correlator flip-flop 117 is connected to additional inputs of audio decoder 106 and video decoder 96 and also to a use meter or recording device 119 in order to control the actuation of all three of these units. Specifically, unless correlator flip-flop 117 is established in a predetermined one of its operating conditions, decoders 106, 96 remain in their normally inoperative positions and thus do not achieve unscrambling. Moreover, use meter 119 is not actuated unless flip-flop 117 is established in a particular operating condition.

Turning now to the operation of the described receiver, the coded television signal is intercepted by antenna 91, amplified in radio-frequency amplifier 90 and heterodyned to the intermediate frequency of the receiver in first detector or oscillator-mixer 92. The resulting intermediate-frequency signal is amplified in intermediate-frequency amplifier 93 and detected in second detector 94 to produce a coded composite video signal which is then amplified in video amplifier 95 and translated through video decoder or encoding device 96 to the input electrodes of image roproducer 97 to control the intensity of the cathode ray beam in the picture tube in conventional fashion. As mentioned previously, decoder 96 is normally biased to be inoperative so that video decoding does not take place. In fact, the bias arrangement may be such that decoder 96 produces no output signal whatsoever, in which case there would be no video information, scrambled or otherwise, supplied to image reproducer 97. Assuming that a proper control potential is applied to video decoder 96 from the output of correlator flip-flop 117, video unscrambling occurs in complementary fashion to the video coding function in the transmitter in order that the input electrodes of picture tube 97 are supplied with completely unscrambled video signal. Sweep systems 101 and 102 are, of course, operated in conventional manner from separator 100.

The intercarrier sound signal is applied to unit 105 from video amplifier 95 wherein it is amplified, amplitude limited and demodulated to a scrambled audio signal which takes essentially the same form as that produced in the output of audio coder 51 in the transmitter. Assuming that audio decoder 106 is provided with a control potential of the proper magnitude and polarity from correlator flip-flop 117, the scrambled audio signal is successfully unscrambled by virtue of fact that the components thereof are returned to their proper positions in the frequency spectrum, and thus the output of audio decoder 106 effectively constitutes a replica of the original uncoded sound signal. This replica is then amplified and reproduced in unit 107.

Of course, it should be obvious that any one of the individual circuits in either the video or audio channel may be arranged to be normally inoperative in order that it may be turned on or rendered operative in response to a control potential from flip-flop 117. For example, video amplifier 95 may have a normally incomplete cathode circuit which is completed through contacts of a relay energized by flip-flop 117.

Mono-stable multivibrator 110 responds to field-drive pulses to produce gating pulses each having a duration sufficient to embrace the time interval in which the code signal and correlation signal components appear during each field-retrace interval, and thus those components are gated in by gate 111 for application to filter and rectifier units 34 and 114. Assuming that code-determining elements 36–40 in the receiver of FIGURE 2 are adjusted to the same settings as their counterparts 36–40 in the transmitter, blocking oscillator 25 and multivibrators 26 and 28 in the receiver operate in synchronism with the corresponding units in the transmitter.

Gates 40–43 and blocking oscillator 25 in the receiver apply pulses to the multivibrators 26 and 28 in precise time coincidence with the application of the actuating pulses to the corresponding multivibrators in the transmitter. In this way, the rectangular shaped control signal developed in the output of multivibrator 28 and used for actuating video decoder 96 has a wave form identical to the wave form applied to video coder 11. Moreover, oscillator 25 in the receiver is likewise reset to produce a pulse in time coincidence with pulse 80.

In order to make a determination as to the correctness of the settings of code-determining elements 36–40 in the receiver, namely to determine if in fact the subscriber has actually adjusted his decoding apparatus properly, correlator multivibrator 117 responds to the leading edge of each field-drive pulse to actuate to a predetermined one of its conditions. For convenience this will be called the "reset" or "reference condition." When in its reset condition the potential developed at the output of flip-flop 117 is of such polarity and magnitude that decoders 106 and 96 are established in their normally inoperative positions.

During the particular field-retrace interval under consideration, filter and rectifier unit 114 responds to the $f_6$ correlation burst of curve M to produce a rectified envelope for gating in line-drive pulse 83, as shown by curve N, to one input of comparison circuit or normally-closed gate 116. Meanwhile, the output pulses of curve B from blocking oscillator 25 in the receiver are applied to gate 116. Since the free count pulse 82 of curve B occurs in precise time coincidence with line-drive pulse 83 of curve N, pulse 83 is produced in the output of comparator or gate 116 for actuating correlator flip-flop 117 from its reset condition to its other operating condition.

The output wave form of flip-flop 117 is shown by curve P. The first amplitude excursion in curve P is, of course, caused by the action of the field-drive pulse of curve D, whereas the second amplitude excursion of wave form P results from the effect of pulse 83. Since the correlation signal component 83 occurs in exact time coincidence with pulse 82 it has now been determined that the correlation status is such that both audio and video decoding should be permitted. Consequently, triggering flip-flop 117 out of its reset to its other condition provides a control potential at the output of the flip-flop of appropriate magnitude and polarity to render the audio and video decoders operative. At the same time, use meter 119 may be actuated to record the fact that the subscriber is subscribing to the program. Of course, the incorporation of recording device 119 is optional. By providing an indication that the subscriber is unscrambling a telecast, meter 119 may be made to record or register that fact on a tape or other recording medium for charging purposes.

It is appreciated that during the time interval embraced by the two amplitude excursions of wave form P decoders 106 and 96 are permitted to fall back to their normally inoperative or non-translating conditions. This may possibly introduce undesirable transients in the video and/or audio signals. Since the time interval between the leading edge of a field-drive pulse and a correlation component is relatively short (in the illustrated example it is eleven line traces in duration), appropriate time constants may be introduced in the system so that the decoders are maintained in their operative conditions during that interval. For example, when the video channel is disabled by employing a normally incomplete cathode circuit which is closed by action of a relay, that relay may be made to have a certain degree of inertia so that once energized it does not become de-energized during the short interval like that illustrated in wave form P.

Thus, it should be appreciated that the receiver of FIGURE 2 is capable of making a correlation test to determine if adjustable code-determining elements 36–40 in the receiver have been adjusted in accordance with the code schedule of the received telecast. The code schedule,, as mentioned before, is the timing pattern of the mode changes of the scrambled video signal. The mode-changing pattern or code schedule of the transmitted video signal is, of course, determined in part by the setting of the code-determining elements at the transmitter and in part by the random aspect of the code signal components.

If a subscriber to the subscription television service has a receiver like that shown in FIGURE 2 but has not subscribed to the program under consideration, the adjustment of code-determining elements 36–40 at that receiver will not correspond to the adjustment of elements 36–40 at the transmitter. Consequently, blocking oscillator 25 at the receiver will not be operated in precise synchronism with oscillator 25 in the transmitter. Thus, at the instant of correlation component 83 of curve N there is only a one in five chance that oscillator 25 will produce a pulse for effectively gating in the correlation component to correlator flip-flop 117. At least 80% of the time, the arrangement will therefore indicate that there is no correlation between the adjustment of the code-determining elements at the receiver with those at the transmitter and the audio and video decoders will not be turned on. Of course, the chances of erroneously indicating correct correlation may be minimized further by modifying oscillator 25 to exhibit a count-down ratio greater than 5:1. For example, it may may be an 8:1 blocking oscillator or counting mechanism as suggested in copending application Serial No. 829,106, filed July 23, 1959, in the name of Richard C. Herrmann et al., and assigned to the present assignee. When an 8:1 blocking oscillator is employed, the state-determining interval has to be increased from six to at least eight line traces or "slots" in order that the oscillator may execute a free count during every state-determining interval. It will be noted that ten slots are employed in copending application Serial No. 829,106.

By way of summary, the secrecy communication receiver of FIGURE 2 is constructed to utilize an intelligence signal (specifically a video signal) coded in accordance with a given code schedule. Blocking oscillator 25, multivibrators 26 and 28, differentiator 29, video decoder 96 and all of the actuating circuitry for these units collectively may be considered decoding apparatus including a plurality of adjustable code-determining elements 36–40 to be adjusted relative to one another in accordance with a pattern dictated by the given code schedule in order to achieve decoding of the intelligence or video signal. This decoding apparatus is selectively operable in one of at least three different operating states as determined, at least partially, by the instantaneous adjustment of the code-determining elements. Since the timing of the periodically recurring pulses from blocking oscillator 25 may exhibit any one of five different phase conditions, the system may effectively be established in any one of five different operating states. The phase condition of the output pulses of oscillator 25, namely the operating state in which the system is established, is determined by the random manner in which oscillator 25 is reset during a state-determining interval, and since reset is controlled by the output of bi-stable multivibrator 28, the operating state is determined in part by code signal components $f_1$–$f_5$ and in part by the particular setting at that time of code-determining elements 36–40.

Normally-closed gates 116 and 115, and $f_6$ filter and rectifier 114 may be considered means for effectively comparing the instantaneous adjustment of code-determining elements 36–40 with the given code schedule of the video signal to determine if the decoding apparatus is established during a particular interval, determined by the given code schedule, in a predetermined operating state. Specifically, correlation is tested during the interval of pulse 83. The timing of pulse 83 is directly determined by the code schedule. Correlator flip-flop 117 constitutes means for deriving from comparing means 115, 116 and 114 a control effect (the signal of curve P) indicating the correlation status between the given code schedule and the instantaneous adjustment of the code-determining elements. This control effect is, of course, utilized by decoders 96 and 106 and use meter 119.

The combination of the periodically recurring line-drive pulses of curve A and the random code and correlation components of curve M may be considered an encoding signal having a characteristic effectively representing the code schedule of the telecast. A portion of this encoding signal, namely the line-drive pulses and the code signal bursts of frequencies $f_1$–$f_5$, is applied to the decoding apparatus for at least partially controlling the actuation of multi-condition mechanism 25 of the decoding apparatus through at least some of its various operating conditions. The operating state established by blocking oscillator 25 is, of course, determined at least partially by the effect of the code bursts. Units 114–116 respond to at least a portion of the encoding signal, namely the correlation bursts, for effectively examining the instantaneous operating condition of multi-condition mechanism 25 during a particular interval, determined by the code schedule, to determine if the multi-condition mechanism is actually established at that time in a predetermined operating condition. Correlation flip-flop 117 may be considered means for deriving from examining means 114–116 a control effect (wave form P) indicating the correlation status between the given code schedule and the instantaneous adjustment of code-determining elements 36–40.

Certain features described in the present application are disclosed and claimed in copending application Serial No. 26,545 filed concurrently herewith, in the name of Norman T. Watters, and assigned to the present assignee.

While particular embodiments of the invention have been shown and described, modifications may be made, and it is intended in the appended claims to cover all such modifications as may fall within the true spirit and scope of the invention.

I claim:

1. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal and selectively operable in one of at least three different operating states as determined partially by the instantaneous adjustment of said code-determining elements; means for comparing the instantaneous adjustment of said code-determining elements with said given code schedule to determine if said decoding apparatus is established during a particular interval, determined by said given code schedule, in a predetermined operating state; and means for deriving from said comparing means a control effect indicating the correlation status between said given code schedule and the instantaneous adjustment of said code-determining elements.

2. A secrecy communication receiver for utilizing an intelligence signal coded in accordance with a given code schedule, comprising: a source of an actuating signal; decoding apparatus, coupled to said source, including a plurality of adjustable code-determining elements to be adjusted relative to one another in accordance with a pattern dictated by said given code schedule in order to achieve decoding of said intelligence signal and, responsive to said actuating signal, to assume a selected one of at least three operating states, the selected state partially being determined by the instantaneous adjustment of said code-determining elements and partially being determined by said actuating signal; means for deriving a correlation signal related to said given code schedule; means responsive to said correlation signal for determining if said decoding apparatus is established during a particular interval, determined by said given code schedule, in a predetermined operating state; and means for deriving from said determining means a control effect indicating the correlation status between said given code schedule and the instantaneous adjustment of said code-determining elements.

3. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal and, responsive to an applied signal, to assume a selected one of at least three operating states, the selected state partially being determined by the instantaneous adjustment of said code-determing elements and partially being determined by the applied signal; means for deriving an encoding signal having a characteristic representing said given code schedule; means for applying at least a portion of said encoding signal to said decoding apparatus for partially controlling the instantaneous operating state thereof; means responsive to a portion of said encoding signal for determining if said decoding apparatus is established during a particular interval, determined by said given code schedule, in a predetermined operating state; and means for deriving from said determining means a control effect indicating the correlation status between said given code schedule and the instantaneous adjustment of said code-determining elements.

4. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal and also including a multi-condition mechanism which, in response to an applied signal, is actuable from one to another of at least three operating conditions in accordance with a schedule partially determined by the instantaneous adjustment of said code-determining elements and partially determined by the applied signal; means for deriving an encoding signal having a characteristic representing said given code schedule; means for applying a portion of said encoding signal to said decoding apparatus for partially controlling the actuation of said multi-condition mechanism through some of its various operating conditions; means responsive to a portion of said encoding signal for examining the instantaneous operating condition of said multi-condition mechanism during a particular interval, determined by said given code schedule, to determine if said mechanism is actually established at that time in a predetermined operating condition; and means for deriving from said examining means a control effect indicating the correlation status between said given code schedule and the instantaneous adjustment of said code-determining elements.

5. A secrecy communication receiver for utilizing an intelligence signal coded in accordance with a given code schedule, comprising: decoding apparatus including a plurality of adjustable code-determining elements to be adjusted relative to one another in accordance with a pattern dictated by said code schedule in order to achieve decoding of said intelligence signal and also including a multi-condition mechanism which, in response to an applied signal, is actuable from one to another of at least three operating conditions in accordance with a schedule partially determined by the instantaneous adjustment of said code-determining elements and partially determined by the applied signal; means for deriving an encoding signal having a characteristic representing said given code schedule; means for applying a portion of said encoding signal to said decoding apparatus for partially controlling the actuation of said multi-condition mechanism through some of its various operating conditions; means coupled to said decoding apparatus and said encoding signal deriving means for developing a pair of comparison signals having wave forms during a particular interval, determined by said given code schedule, determined by the instantaneous adjustment of said code-determining elements and by said given code schedule, respectively; a comparison device responsive to said comparison signals for determining if said multi-condition mechanism is established during said particular interval in a predetermined operating condition; means for deriving from said comparison device a control effect indicating the correlation status between said given code schedule and the instantaneous adjustment of said code-determining elements.

6. A secrecy communication receiver for utilizing an intelligence signal coded in accordance with a given code schedule and also an encoding signal including correlation components related to said code schedule, said receiver comprising: decoding apparatus including a plurality of adjustable code-determining elements to be adjusted relative to one another in accordance with a pattern dictated by said given code schedule in order to achieve decoding of said intelligence signal and also including a multi-condition mechanism which, in response to an applied signal, is actuable from one to another of at least three operating conditions in accordance with a schedule partially determined by the instantaneous adjustment of said code-determining elements and partially determined by the applied signal; means for applying at least a portion of said encoding signal to said decoding apparatus for partially controlling the actuation of said multi-condition mechanism through some of its various operating conditions; means responsive to said correlation components for examining the instantaneous operating condition of said multi-condition mechanism during a particular interval, determined by said given code schedule, to determine if said mechanism is actually established at that time in a predetermined operating condition; and means for deriving from said examining means a control effect indicating the correlation status between said given code schedule and the instantaneous adjustment of said code-determining elements.

7. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal and also including a counting mechanism executing at least three operating steps in completing a cycle of operation which, in response to an applied signal, is actuable as between said steps in accordance with a schedule partially determined by the instantaneous adjustment of said code-determining elements and partially determined by the applied signal; means for deriving an encoding signal having a characteristic representing said given code schedule; means for applying a portion of said encoding signal to said decoding apparatus for partially controlling the actuation of said counting mechanism through some of its various operating steps; means responsive to a portion of said encoding signal for examining the instantaneous operating step of said counting mechanism during a particular interval, determined by said given code schedule, to determine if said counting mechanism is actually established at that time in a predetermined operating step; and means for deriving from said examining means a control effect indicating the correlation status between said given code schedule and the instantaneous adjustment of said code-determining elements.

8. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal and also including a cycling mechanism which, in response to applied periodically recurring signal components, is actuated step-by-step through a sequence of at least three operating steps in completing each cycle of operation and, in response to random code signal components, is randomly actuated from one to another of its steps to disrupt said sequence in accordance with a schedule partially determined by the instantaneous adjustment of said code-determining elements and partially determined by the applied signal components; means for deriving an encoding signal having a characteristic representing said given code schedule; means for applying a portion of said encoding signal to said decoding apparatus for partially controlling the actuation of said cycling mechanism through some of its various operating steps; means responsive to a portion of said encoding signal for examining the instantaneous operating step of said cycling mechanism during a particular interval, determined by said given code schedule, to determine if said cycling mechanism is actually established at that time in a predetermined operating step; and means for deriving from said examining means a control effect indicating the correlation status between said given code schedule and the instantaneous adjustment of said code-determining elements.

9. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal and also including a multi-condition mechanism which, in response to an applied signal, is actuable from one to another of at least three operating conditions in accordance with a schedule partially determined by the instantaneous adjustment of said code-determining elements and partially determined by the applied signal; means for deriving an encoding signal, including a correlation signal component, having a characteristic representing said given code schedule; means for applying a portion of said encoding signal to said decoding apparatus for partially controlling the actuation of said multi-condition mechanism through some of its various operating conditions; means for deriving a comparison signal from said decoding apparatus when said multi-condition mechanism is established in a predetermined operating condition; means for comparing said comparison signal with said correlation signal component to determine, by their time relationship, if said multi-condition mechanism is established during a particular interval, determined by said code schedule, in said predetermined operating condition; and means for deriving from said comparing means a control effect indicating the correlation status between said given code schedule and the instantaneous adjustment of said code-determining elements.

10. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal and, responsive to an applied signal, selectively operable in one of at least three operating states in accordance with a schedule partially determined by the instantaneous adjustment of said code-determining elements and partially determined by the applied signal; means for deriving an encoding signal having a characteristic representing said given code schedule; means for applying a portion of said encoding signal to said decoding apparatus for partially controlling the operating state of said decoding apparatus; means responsive to a portion of said encoding signal for examining the instantaneous operating operating state of said decoding apparatus during a particular interval, determined by said given code schedule, to determine if said decoding apparatus is actually established at that time in a predetermined operating state; means for deriving from said examining means a control effect indicating the correlation status between said given code schedule and the instantaneous adjustment of said code-determining elements; a controlled device having a plurality of operating conditions; and means responsive to said control effect for establishing said controlled device in a predetermined one of its operating conditions.

11. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal and, responsive to an applied signal, selectively operable in one of at least three operating states in accordance with a schedule partially determined by the instantaneous adjustment of said code-determining elements and partially determined by the applied signal; means for deriving an encoding signal having a characteristic representing said given code schedule; means for applying a portion of said encoding signal to said decoding apparatus for partially controlling the operating state of said decoding apparatus; means responsive to a portion of said encoding signal for examining the instantaneous operating state of said decoding apparatus during a particular interval, determined by said given code schedule, to determine if said decoding apparatus is actually established at that time in a predetermined operating state; means for deriving from said examining means a control effect indicating the correlation status between said given code schedule and the instantaneous adjustment of said code-determining elements; a signal reproducer; and means responsive to said control effect for controlling the responsiveness of said reproducer.

12. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal and, responsive to an applied signal, selectively operable in one of at least three operating states in accordance with a schedule partially determined by the instantaneous adjustment of said code-determining elements and partially determined by the applied signal; means for deriving an encoding signal having a characteristic representing said given code schedule; means for applying a portion of said encoding signal to said decoding apparatus for partially controlling the operating state of said decoding apparatus; means responsive to a portion of said encoding signal for examining the instantaneous operating state of said decoding apparatus during a particular interval, determined by said given code schedule, to determine if said decoding apparatus is actually established at that time in a predetermined operating state; means for deriving from said examining means a control effect indicating the correlation status between said given code schedule and the instantaneous adjustment of said code-determining elements; a use recorder; and means responsive to said control effect for actuating said use recorder.

13. A communication receiver comprising: signal-generating apparatus, including a plurality of adjustable code-determining elements to be adjusted in accordance with a predetermined adjustment, and selectively operable in one of at least three different states as determined in part by the instantaneous adjustment of said code-determining elements; means for comparing the instantaneous adjustment of said code-determining elements with said predetermined adjustment to determine if said signal-generating apparatus is established during a particular interval in a predetermined operating state; and means for deriving from said comparing means a control effect indicating the correlation status between said predetermined adjustment and the instantaneous adjustment of said code-determining elements.

No references cited.